United States Patent
Baltz et al.

(10) Patent No.: US 6,522,039 B1
(45) Date of Patent: Feb. 18, 2003

(54) REMOTE POWER SOURCE FOR ELECTROSTATIC PAINT APPLICATOR

(75) Inventors: James P. Baltz, Waterville, OH (US); Gene P. Altenburger, Maumee, OH (US); Brian E. Gorrell, Angola, IN (US); Varce E. Howe, Zionsville, IN (US); Richard P. Bolger, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 08/764,576

(22) Filed: Dec. 13, 1996

(51) Int. Cl.[7] ............................................. H02K 5/136
(52) U.S. Cl. ......................... 310/88; 239/690; 290/54; 310/89
(58) Field of Search ...................... 310/88, 89, 113; 239/690, 705; 290/54

(56) References Cited

U.S. PATENT DOCUMENTS

| | | | | |
|---|---|---|---|---|
| 508,380 A | * | 11/1893 | Gardner ........................ 310/88 |
| 1,477,781 A | * | 12/1923 | Standerwick ................ 290/54 |
| 2,452,248 A | * | 10/1948 | Lee ............................... 172/36 |
| 2,465,436 A | * | 3/1949 | Eckert .......................... 310/52 |
| 3,562,405 A | * | 2/1971 | Stanley et al. ................ 310/88 |
| 3,791,579 A | * | 2/1974 | Cowan ........................... 239/3 |
| 4,219,865 A | | 8/1980 | Malcolm ..................... 361/228 |
| 4,242,628 A | * | 12/1980 | Mohan et al. ................. 322/35 |
| 4,290,091 A | | 9/1981 | Malcolm ..................... 361/228 |
| 4,462,061 A | * | 7/1984 | Mommsen .................. 361/222 |
| 4,469,956 A | * | 9/1984 | D'Amato ..................... 290/55 |
| 4,491,276 A | * | 1/1985 | Reeves ........................ 239/692 |
| 4,511,807 A | * | 4/1985 | Somerville ................... 290/44 |
| 4,691,865 A | * | 9/1987 | Hoffman et al. ............ 239/690 |
| 5,073,736 A | * | 12/1991 | Gschwender et al. ......... 310/88 |
| 5,080,289 A | * | 1/1992 | Lunzer ........................ 239/690 |
| 5,218,305 A | * | 6/1993 | Lunzer ........................ 324/457 |
| 5,487,782 A | * | 1/1996 | Seewaldt .................... 118/621 |
| 5,491,602 A | * | 2/1996 | Horn et al. .................. 361/228 |

FOREIGN PATENT DOCUMENTS

| | | | | |
|---|---|---|---|---|
| EP | 326269 | * | 8/1989 | ................. 239/690 |
| GB | 2019745 | * | 11/1979 | ................. 239/690 |

OTHER PUBLICATIONS

Approval Standard, Explosionproof Electrical Equipment, General Requirements, Class No. 3615, Factory Mutual Research, Mar., 1989.

* cited by examiner

Primary Examiner—Karl Tamai
(74) Attorney, Agent, or Firm—MacMillan, Sobanski & Todd, LLC

(57) ABSTRACT

A remote low voltage power source for electrostatic paint applicators used in hazardous locations. A low voltage generator and voltage conditioning and regulating circuitry are mounted in a small explosion proof housing. A generator shaft and a shaft on a voltage level adjusting potentiometer extend through and projects from the housing. The flame-path and the flame gap for the shafts meet explosion proof standards while permitting shaft rotation. An air driven turbine is mounted on the exterior of the housing and is connected to the projecting generator shaft to drive the generator. The low voltage is applied to a spray gun which includes circuitry for increasing the voltage to a high level for electrostatic charging sprayed paint.

10 Claims, 2 Drawing Sheets

REMOTE POWER SOURCE FOR ELECTROSTATIC PAINT APPLICATOR

BACKGROUND OF THE INVENTION

In one painting method which is frequently used for commercial operations, the atomized paint is electrostatically charged to a high voltage relative to the workpiece being coated. The electrostatic charge causes the atomized paint to be drawn to the workpiece. This significantly increases the paint transfer efficiency, thus reducing both the labor and material costs to paint the workpiece and reducing environmental problems. In a normal commercial painting operation, the workpiece is placed in a spray booth prior to painting. A low voltage power source, a compressed air hose and a paint hose are connected from exterior to the spray booth to the spray gun. The spray gun typically includes an oscillator and a voltage multiplying circuit for increasing the low voltage to a very high dc voltage for charging the paint as it is atomized. The high voltage may be, for example, up to 100 KV or more.

In some applications, it is not possible to use a conventional spray booth because of the size of the workpiece being sprayed. For example, an airplane will not fit into a conventional spray booth. In this case, the airplane hanger becomes the spray booth for confining the paint overspray and fumes. Since the paint may include flammable volatile organic compounds (VOC's) as solvent, the hanger is considered a hazardous location and extreme care must be taken to prevent sparks which possibly could ignite the VOC vapors. A conventional low voltage power source which is connected to an electrostatic spray gun does not meet certain safety standards for operation in hazardous locations. Conventional switches, potentiometers and other circuit components and connections present a risk of sparks.

One method for meeting the hazardous location safety standards has been to place the low voltage source directly in the spray gun. As shown in U.S. Pat. Nos. 4,219,865 and 4,290,091, the spray gun may be provided with an internal generator which is driven by an air turbine for generating a low voltage without any electrical connections to the spray gun. Conventional voltage multiplying and rectifying circuitry is used in the spray gun to convert the low voltage to a high dc voltage for charging the paint. In operation, the turbine shares air with the atomization air delivered to the spray gun. The turbine air must be exhausted from the spray gun after use. In some applications, this can cause problems with dust agitation. The internal turbine and generator also significantly increase the weight of the spray gun which the operator must hold during spraying. Since aircraft are very large, the painting time may be quite long and the added weight can quickly tire the operator. Because of the rotary motion of the turbine in the spray gun, vibrations are transmitted into the handle of the spray gun. These vibrations are felt by the operator when the gun is used. The cost of a spray gun with an internal turbine and generator is quite high. Consequently, it is quite expensive to maintain spare spray guns, since each gun must include a turbine and a generator.

BRIEF SUMMARY OF THE INVENTION

According to the invention, a low voltage power source including an electric generator and low voltage power regulating and control circuitry are mounted in a sealed, explosion proof housing which meets hazardous location safety standards. The low voltage power source is suitable for locating in a spray booth and in a hanger in which an airplane is being painted with paint having flammable solvents. The generator has a drive shaft which extends through and projects from the housing. An air driven turbine is attached to the housing and is connected to rotate the projecting turbine shaft. The low voltage power circuitry includes a voltage regulator and a potentiometer. The potentiometer has a shaft which extends through the housing for manually setting the output voltage level. The flamepath and the flame gap at the generator and potentiometer shafts are made to meet explosion proof standards. The turbine does not share the air source with the spray gun. The power source is located in an area where the exhaust air will not have an effect on the spray area. Since the rotating turbine and generator are not located in the spray gun, no vibrations are transmitted to the hand of the spray gun operator. Further, the spray gun will be much lighter than spray guns having an internal air turbine and generator and it will be less expensive for the user to maintain spare guns, since it is not necessary to purchase a turbine and a generator with each gun.

Accordingly, it is an object of the invention to provide an improved remote power generator for electrostatic paint applications which meets safety requirements for operation in hazardous locations.

Other objects and advantages of the invention will become apparent from the following detailed description of the invention and the accompanying drawings.

DETAILED DESCRIPTION OF THE INVENTION

Figure 1:
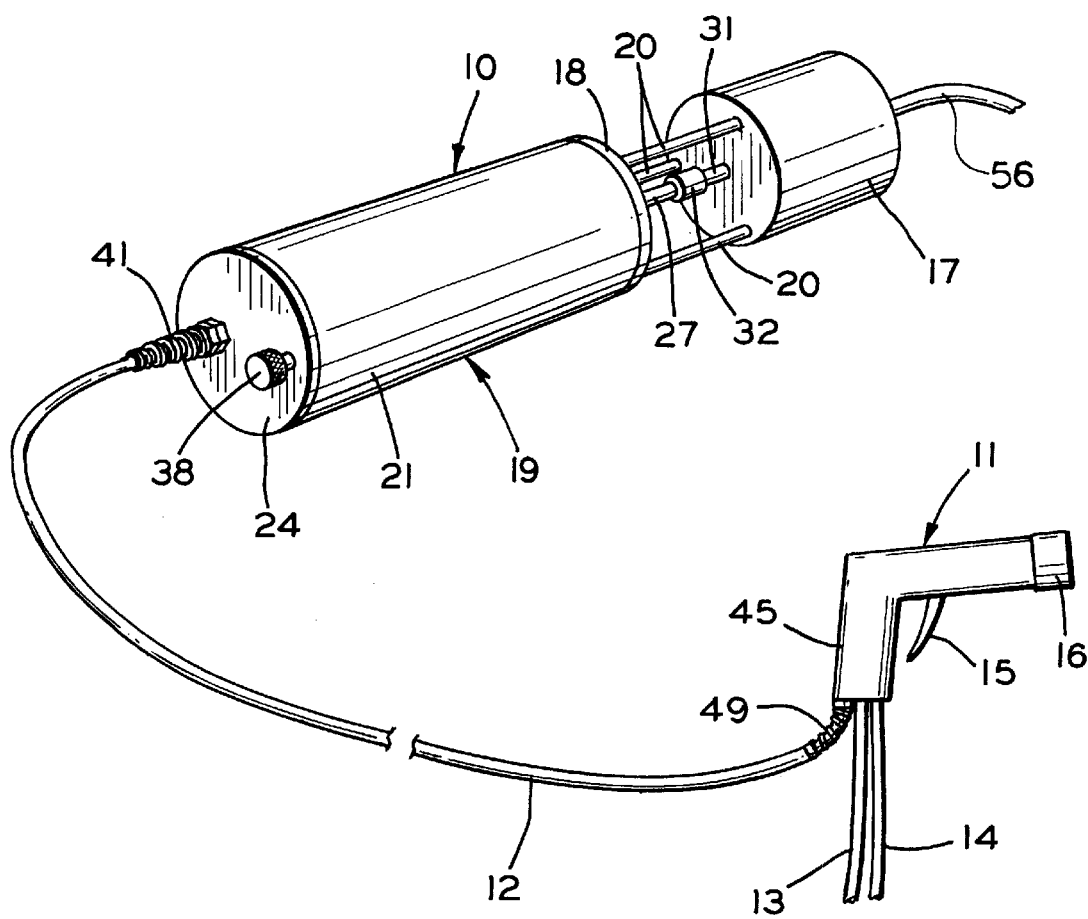
FIG. 1 is a diagrammatic perspective view of a hand held electrostatic spray gun connected to a remote power source according to the invention.

Turning first to FIG. 1, a low voltage power source 10 according to the invention is shown connected to an electrostatic hand held paint spray gun 11. The spray gun 11 has three external connections: a low voltage insulated cable 12 connected to the power source 10, a compressed air hose 13 and a paint hose 14. The compressed air hose is connected to a conventional source (not shown) of pressurized air, such as an air compressor or a compressed air line. The paint hose 14 is connected to a pressurized paint tank. When an operator squeezes a trigger 15 on the spray gun 11, an internal air valve (not shown) is opened to initiate a flow of atomization air to a nozzle assembly 16 and then an internal paint valve (not shown) is opened to initiate a flow of paint to the nozzle assembly 16.

The cable 12 applies a low dc voltage to the spray gun 11. The voltage may be, for example, at a regulated level between 0 and 10 volts dc. This voltage is applied to the input of a conventional high voltage power supply (not shown) internal to the spray gun 11. The high voltage power supply includes an oscillator which converts the dc input voltage to a higher level ac voltage. The ac voltage is then applied to a capacitor and diode network which multiplies and converts the voltage to a very high level dc voltage, as is well known in the art. The actual level of the high voltage will depend on the level of the dc input voltage. By adjusting the level of the dc voltage applied on the cable 12, the level of the high voltage is adjusted.

Figure 2:
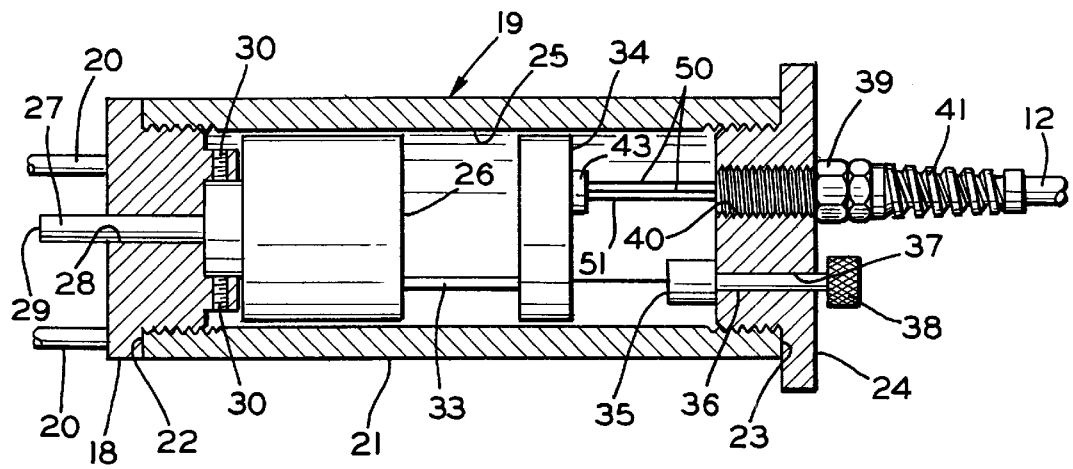
FIG. 2 is a fragmentary cross sectional diagrammatic view through the generator and circuitry housing for the remote power source of FIG. 1.

Referring to FIGS. 1 and 2, the power source 10 includes an air motor or turbine 17 which is mounted on an end cap 18 of an explosion proof housing 19 by means of a plurality of legs or brackets 20. The air turbine 17 is connected through a hose 56 to a conventional source (not shown) of compressed air, such as an air compressor or a pressurized air line. Three spaced brackets 20 are shown in the illustrated power source 10. The brackets 20 isolate the turbine 17 from the housing 19 to reduce noise. The housing 19 includes a tubular center portion 21 having opposed threaded ends 22 and 23. The end cap 18 is screwed onto the threaded end 22 and an end cap 24 is screwed onto the threaded end 23. The threaded ends 22 and 23 of the tubular housing portion 21 either may be internally threaded, as shown, or externally threaded for mounting the end caps 18 and 24. The housing 19 defines a closed interior chamber 25 in which an electric generator 26 is located. The generator 26 is mounted on the end cap 18 and has a drive shaft 27 which extends through an opening 28 in the end cap 18 and has a projecting end 29. The generator is illustrated as being mounted on the end cap 18 with a plurality of screws 30. However, other techniques for mounting the generator 26 on the end cap 18 will be apparent to those skilled in the art.

Preferably, the generator shaft 27 is aligned on an axis of the housing 19. The air turbine 17 has an output shaft 31. The air turbine 17 is mounted on the end cap 18 so that its output shaft 31 is aligned with the projecting end 29 of the generator shaft 27. The shafts 27 and 31 are connected together with a coupling 32 so that when the turbine shaft 31 rotates, it rotates the generator shaft 29 to cause the generator 26 to produce electrical power.

It will be appreciated that the electrical output from the generator 26 will vary with the speed at which it is driven by the turbine 17. Preferably, the generator 26 produces ac power. Both the frequency and the output voltage will vary as a function of the turbine speed. The output from the generator 26 is applied on wires 33 to circuitry 34 which regulates and conditions the output to produce a constant low level dc voltage, for example, a constant dc voltage within the range of from 0 to 10 volts. A potentiometer 35 may be used to adjust the output voltage level within the range in order to adjust level of the high voltage generated in the spray gun 11. The potentiometer 35 has a shaft 36 which extends through an opening 37 in the end cap 24. A knob 38 is provided on the shaft 36 to facilitate voltage adjustment.

The low voltage electrical cable 12 has a threaded connector 39 which engages a threaded opening 40 in the end cap 24. A flexible strain relief 41 is positioned on the cable 12 adjacent the connector 39. A plurality of insulated wires 50 and 51 from the cable 12 are secured to the circuitry 34 with an end plug 43. At the connector 39, the cable is sealed with potting in order to form a gas tight connection and to meet explosion proof standards.

The housing 19 is of an explosion proof construction. The walls of the housing 19 are made sufficiently strong to withstand an internal explosion in the event that vapors or materials within the housing chamber 25 should be ignited. Preferably, the housing 19 is constructed to meet safety standards such as those developed by Factory Mutual Research. Equipment enclosed in a case has been defined as being "explosion proof" if the case is capable of: a) withstanding an internal explosion of a specified gas or vapor-in-air atmosphere; b) preventing the ignition of a specified gas or vapor-in-air atmosphere surrounding the enclosure due to internal sparks, flashes or explosion; and c) operating at temperatures which will not ignite the surrounding classified atmosphere. In order to meet these standards, the walls of the housing 19 must be of a sufficient strength. Where threaded connections are made, as where the end caps 18 and 24 are secured to the tubular portion 21, and where the cable connector 39 engages the end cap 24, a minimum number of threads must be engaged.

In addition to a minimum housing strength, there must be a minimum length of flamepath and no greater than a maximum gap of flamepath at all gaps, openings and joints in the housing. "Flamepath" is defined as the place where corresponding surfaces of two parts of an enclosure come together and prevent the transmission of an internal explosion to the atmosphere surrounding the enclosure. "Gap of flamepath" refers to the distance between the corresponding surfaces of a joint measured perpendicular to the surfaces. For circular surfaces, this gap is defined as the difference between the two diameters, or the diametrical clearance. "Length of flamepath" is defined as the shortest path along a joint surface from the inside to the outside of an enclosure. For a given internal volume for the enclosure and type of joint, the relationship between the length of flamepath and the gap of flamepath are defined for meeting explosion proof standards. For example, for an enclosure volume of between 6 and 120 cubic inches (between 98 and 1966 cc), if the length of flamepath along a shaft is between 1 inch (2.54 cm) and 1.57 inches (3.99 cm), then the gap of flamepath must be no greater than 0.008 inch (0.02 cm). Thus, a diametric clearance of no greater than 0.008 inch (0.02 cm) may be provided around the generator shaft 27 as it passes through the end cap 18, provided the housing volume and minimum length of flamepath parameters are met. This permits passing the generator shaft 27 through the end cap opening 28 without a seal while avoiding the risk of a spark within the housing chamber 25 igniting the surrounding atmosphere. Similarly, suitable gap of flamepath and length of flamepath are provided between the potentiometer shaft 36 and the opening 37 in the end cap 24 to permit rotation of the shaft 36 while meeting explosion proof standards.

Figure 3:
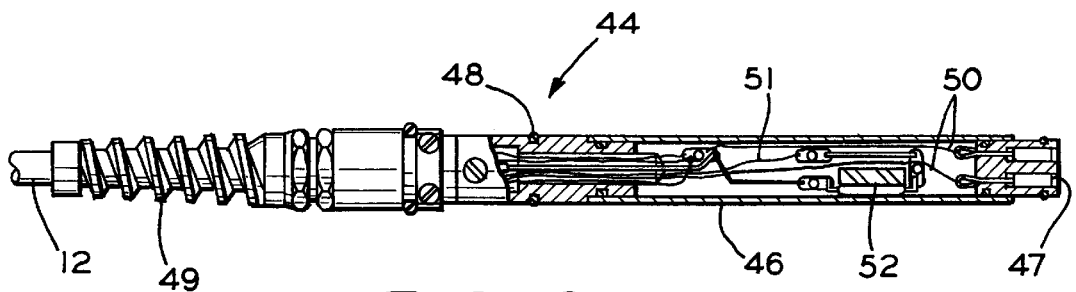
FIG. 3 is an enlarged fragmentary view, in partial section, of a connector for attaching a power cable to the electrostatic spray gun.

Referring to FIGS. 1 and 3, the low voltage cable 12 has an end connector 44 which plugs into a handle 45 on the spray gun 11. The connector 44 has a cylindrical end 46 terminating at a plug 47 which engages a mating plug or socket (not shown) in the spray gun 11. The cylindrical end 46 slides into an opening (not shown) in the spray gun handle 45 and is sealed to the handle with an o-ring seal 48. A strain relief 49 surrounds the cable 12 where it joins the connector 44. Within the cylindrical end 46, two low voltage wires 50 from the cable 12 connect to the plug 47. In addition, the cable 12 carries a third wire 51 which connects to one terminal on a small reed switch 52. A second terminal on the switch 52 is connected to one of the low voltage wires 50. A magnet (not shown) is positioned in the spray gun handle to operate the switch 52 when the connector 44 is fully seated in the spray gun handle 45. Thus, the wire 51 carries a signal indicating whether or not the connector 44 is properly connected to the spray gun 11.

Figure 4:
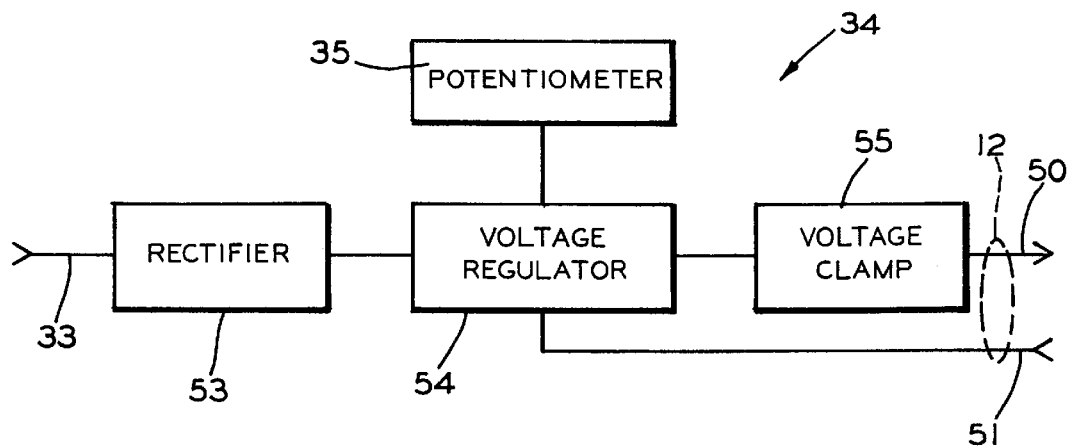
FIG. 4 is a block diagram for circuitry for rectifying and regulating the voltage applied to the electrostatic spray gun.

FIG. 4 is an exemplary block diagram for the circuit 34. The voltage produced by the generator 26 is applied over the wires 33 to a rectifier 53 which converts the ac voltage to a dc voltage. The dc voltage is then applied to a voltage regulator 54 which establishes a constant low level output voltage. The potentiometer 35 is connected to the voltage regulator 54 for setting the output voltage level to in turn select a high voltage level for charging paint discharged from the spray gun 11. Preferably, a voltage clamp 55 is located between the voltage regulator 54 and the cable 12 to limit the maximum output from the circuit 34 for protecting the oscillator and voltage multiplying circuitry in the spray gun from any risk of excessive voltage in the event of a failure of the voltage regulator 54. The wire 51 from the reed switch 52 in the spray gun connector 44 is connected to the voltage regulator 54 to inhibit an output voltage when the connector 44 is removed from or not properly seated in the spray gun handle 45. Thus, any possible risk of a spark caused by a lose connection between the cable 12 and the spray gun 11 is eliminated.

The above described low voltage remote power source 10 has several advantages over an air operated power source located in a spray gun. First, the weight of the spray gun is significantly reduced, thus reducing possible strain on the operator's hand, wrist and arm. The cost of the spray gun, and of replacement spray guns, is reduced. Further, any vibrations produced by rotation of the air turbine 17 and the generator 26 are separate from the spray gun 11 and are not transmitted to the operator's hand. However, the remote power supply 10 is suitable for use in hazardous locations, such as in paint spray booths and aircraft hangers during spraying without an increased risk of an explosion.

It will be appreciated that various modifications and changes may be made to the above described preferred embodiment of remote power source for an electrostatic paint applicator without departing from the scope of the following claims.

What is claimed is:

1. A remote power source for an electrostatic paint applicator comprising a generator, a sealed explosion proof housing enclosing said generator, said generator having a drive shaft with an end projecting through an opening in said housing, said shaft and said housing opening having a diametrical clearance of no greater than 0.008 inch, an air turbine located exterior to said housing and connected to rotate said generator shaft to cause said generator to generate electrical power, and a circuit enclosed within said housing adapted to establish a predetermined low voltage output in response to electrical power from said generator when said air turbine drives said generator.

2. A remote power source for an electrostatic paint applicator, as set forth in claim 1, and wherein said air turbine is spaced from said housing and is secured to a plurality of brackets which extend from said housing, said air turbine having a driven shaft which is substantially aligned with said projecting generator shaft end, and including a coupler connecting said air turbine shaft end to said projecting generator shaft end.

3. A remote power source for an electrostatic paint applicator, as set forth in claim 2, and wherein said housing includes a tubular section having first and second threaded end openings, a first threaded end cap engaging said first threaded end opening, and a second threaded end cap engaging said second threaded end opening.

4. A remote power source for an electrostatic paint applicator, as set forth in claim 3, and wherein said housing opening is centered in said first end cap and wherein said brackets are attached to said first end cap for mounting said air turbine on said first end cap.

5. A remote power source for an electrostatic paint applicator, as set forth in claim 4, and further including a low voltage cable having a first end extending through and sealed to said second end cap and having a second end adapted to connect to an electrostatic paint applicator.

6. A remote power source for an electrostatic paint applicator, as set forth in claim 1, and wherein said housing includes a tubular section having first and second threaded end openings, a first threaded end cap engaging said first threaded end opening, and a second threaded end cap engaging said second threaded end opening.

7. A remote power source for an electrostatic paint applicator, as set forth in claim 3, and wherein said housing opening is centered in said first end cap and wherein said brackets are attached to said first end cap for mounting said air motor on said first end cap.

8. A remote power source for an electrostatic paint applicator comprising a generator, a sealed explosion proof housing enclosing said generator, said generator having a drive shaft with an end projecting through an opening in said housing, said shaft and said housing opening having a diametrical clearance of no greater than 0.008 inch, an air motor located exterior to said housing and connected to rotate said generator shaft to cause said generator to generate electrical power, and a circuit enclosed within said housing adapted to establish a predetermined low voltage output in response to electrical power from said generator when said air motor drives said generator.

9. A remote power source for an electrostatic paint applicator, as set forth in claim 1, and wherein said air motor is spaced from said housing and is secured to a plurality of brackets which extend from said housing, said air motor having a driven shaft which is substantially aligned with said projecting generator shaft end, and including a coupler connecting said air motor shaft end to said projecting generator shaft end.

10. A remote power source for an electrostatic paint applicator comprising a generator, a sealed explosion proof housing enclosing said generator, said housing includes a tubular section having first and second threaded end openings, a first threaded end cap engaging said first threaded end opening and a second threaded end cap engaging said second threaded end opening, said generator having a drive shaft with an end projecting through an opening centered in said first end cap in said housing, said shaft and said housing opening having a diametrical clearance of no greater than 0.008 inch, an air turbine located exterior to and spaced from said housing and is secured to a plurality of brackets attached to and extending from said first end cap for mounting said air turbine on said first end cap, said air turbine mounted on said brackets having a driven shaft which is substantially aligned with said projecting generator shaft end, a coupler connecting said air turbine shaft end to said projecting generator shaft end to rotate said generator shaft to cause said generator to generate electrical power, a circuit enclosed within said housing adapted to establish a predetermined low voltage output in response to electrical power from said generator when said air turbine drives said generator, a low voltage cable having a first end connected to receive the predetermined low voltage output and extending through and sealed to said second end cap and having a second end adapted to connect to an electrostatic paint applicator, and a potentiometer mounted in said housing and connected to said circuit for setting the level of the low voltage output, said potentiometer having a shaft projecting through an opening in said second end cap, said potentiometer shaft and said second end cap opening having a diametrical clearance of no greater than 0.008 inch.

* * * * *